United States Patent [19]
Conrad et al.

[11] Patent Number: 5,301,848
[45] Date of Patent: Apr. 12, 1994

[54] ELECTROMAGNETIC METER FOR CLOSED DISPENSING CONTAINER

[76] Inventors: Larry M. Conrad, R.R. 1 - Box 103, Delta, Iowa 52550; David S. Walton, 483 W. Street Rd., Kennett Square, Pa. 19348

[21] Appl. No.: 961,460

[22] Filed: Oct. 15, 1992

Related U.S. Application Data

[63] Continuation-in-part of Ser. No. 779,075, Oct. 18, 1991, Pat. No. 5,156,372.

[51] Int. Cl.$^5$ .............................................. A01C 15/04
[52] U.S. Cl. .................................... 222/613; 222/325; 222/504; 251/65; 251/129.21; 251/298; 111/903
[58] Field of Search ............... 222/504, 517, 613, 614, 222/325; 239/577; 251/65, 129.04, 129.21, 298; 111/903, 904

[56] References Cited

U.S. PATENT DOCUMENTS

| | | | |
|---|---|---|---|
| 3,120,943 | 2/1964 | Donelan | 251/129.21 |
| 3,245,652 | 4/1966 | Roth | 251/129.21 X |
| 4,164,669 | 8/1979 | Knepler | 111/903 X |
| 4,585,209 | 4/1986 | Aine et al. | 251/298 X |
| 4,587,795 | 5/1986 | Yamashita | 222/504 X |
| 4,928,607 | 5/1990 | Luigi | 111/904 X |
| 5,024,356 | 6/1991 | Gerling et al. | |
| 5,029,624 | 7/1991 | McCunn et al. | |
| 5,156,372 | 10/1992 | Conrad | 251/65 |

*Primary Examiner*—Gregory L. Huson
*Attorney, Agent, or Firm*—Henderson & Sturm

[57] ABSTRACT

A metering device for controlling the flow of granular material through a conduit. The metering device includes a electrical coil operably associated with the conduit, a ferromagnetic latching strip disposed in the magnetic field produced by the coil, and a pivoting gate including a magnet that is attracted toward and repelled from the latching strip as the direction of electrical current flowing through the coil is changed. A closed container includes the metering device secured to its bottom so that the granular material can be dispensed only through the meter. The closed container is electrically connected by wires to a dispensing controller located in the tractor cab. The granular material, such as insecticide, is simultaneously and equally dispensed at the desired rate to the seed furrows from all the individual planting units of the planter.

14 Claims, 7 Drawing Sheets

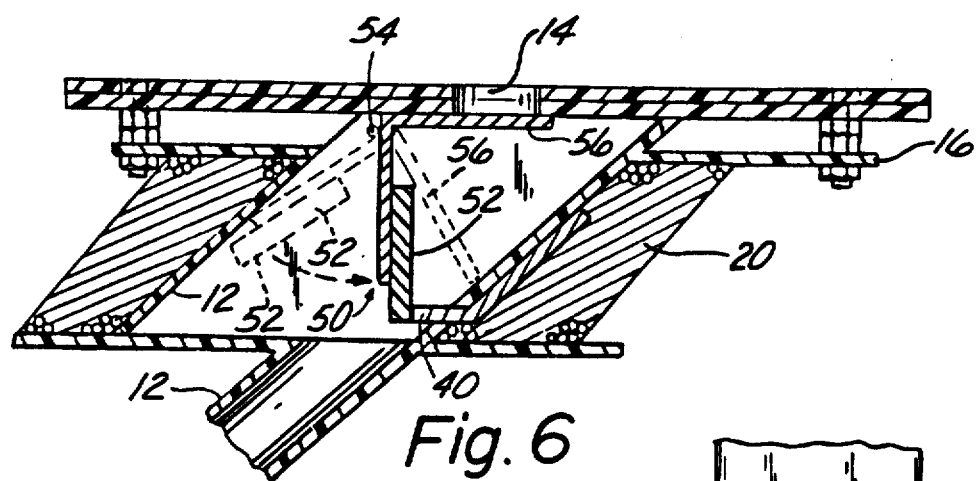
Fig. 6
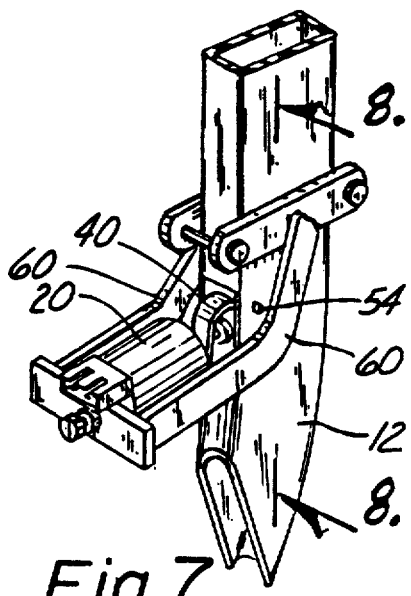
Fig. 7
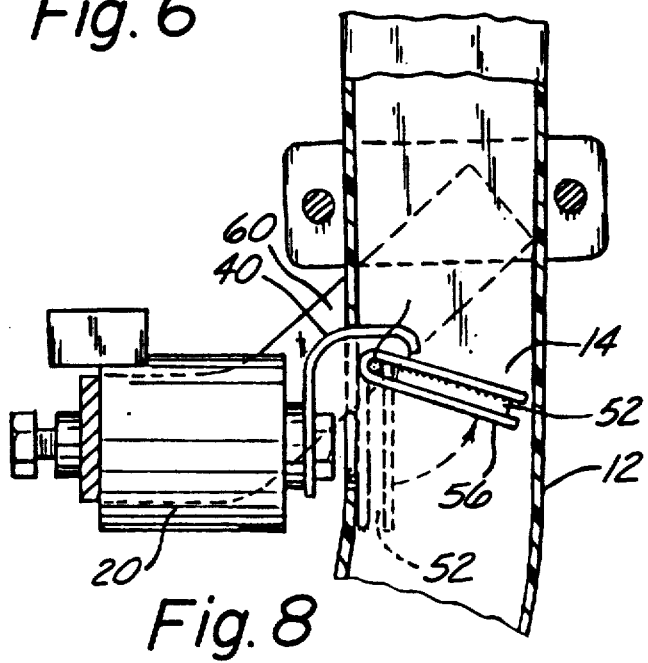
Fig. 8
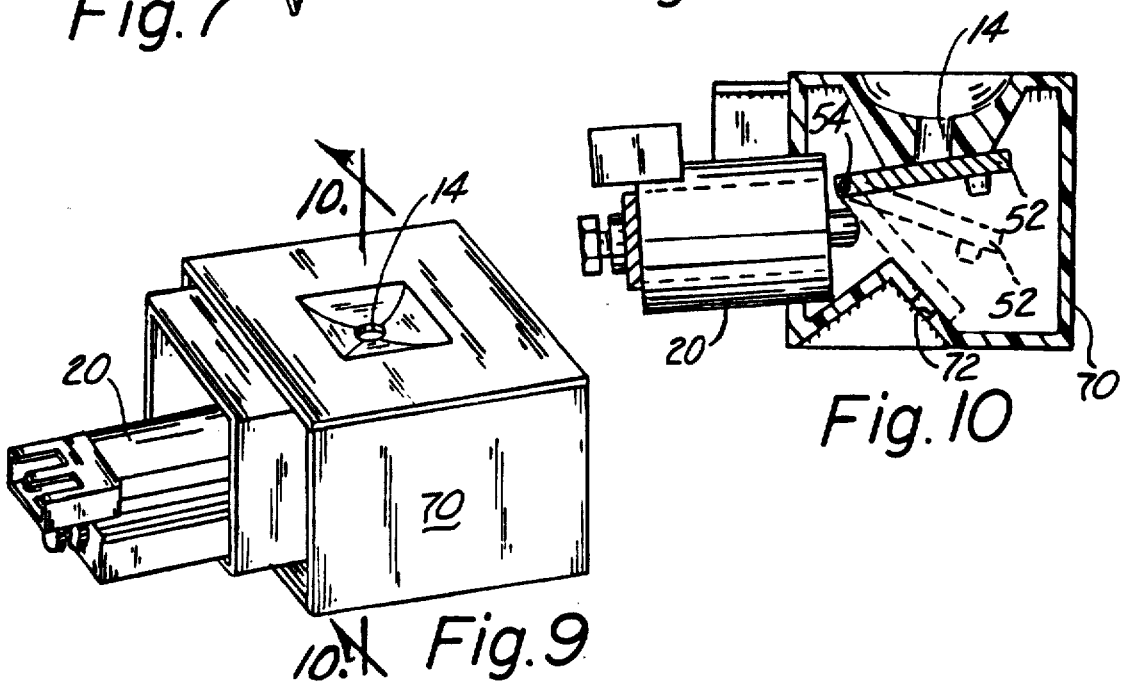
Fig. 9
Fig. 10

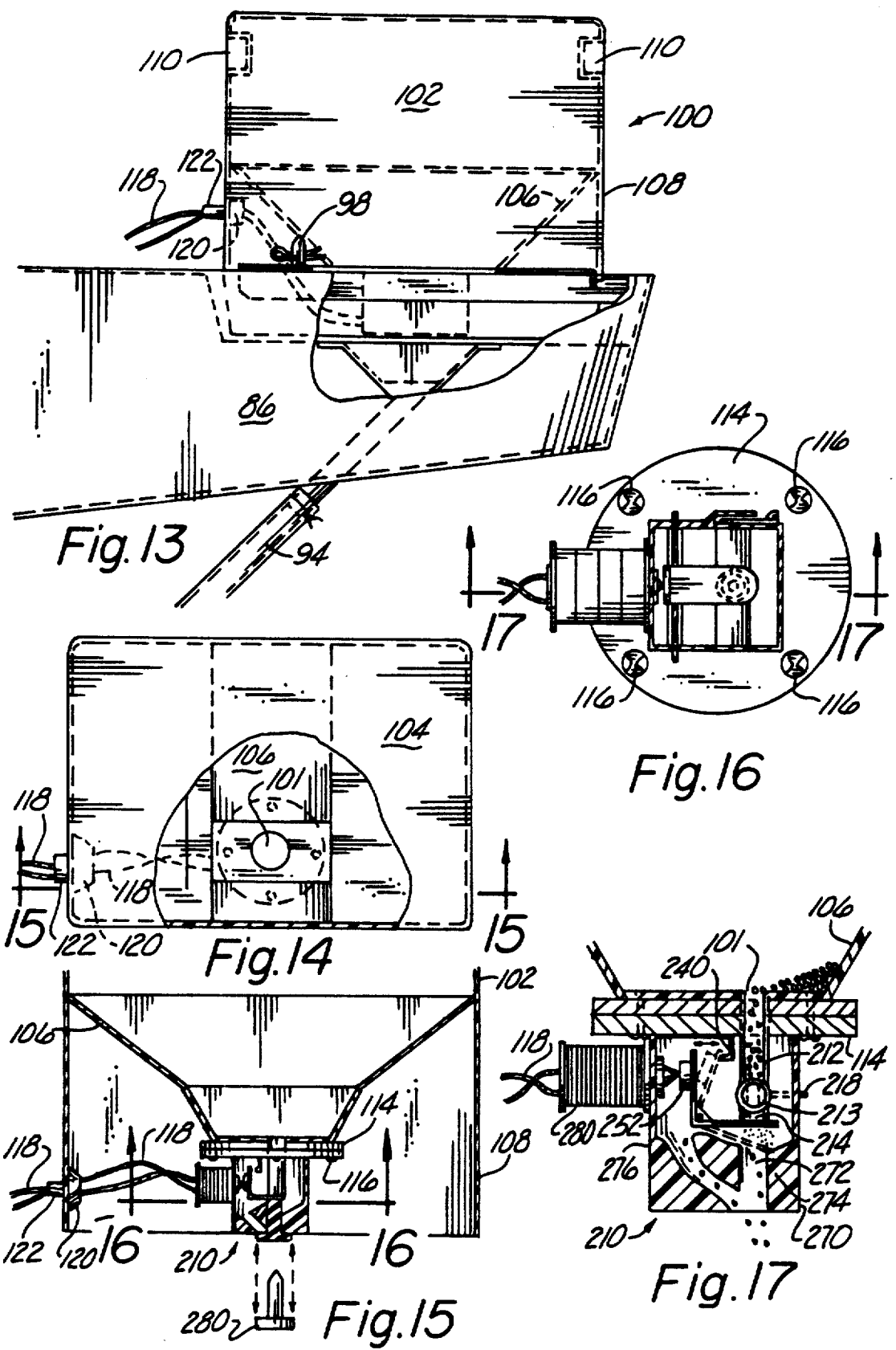

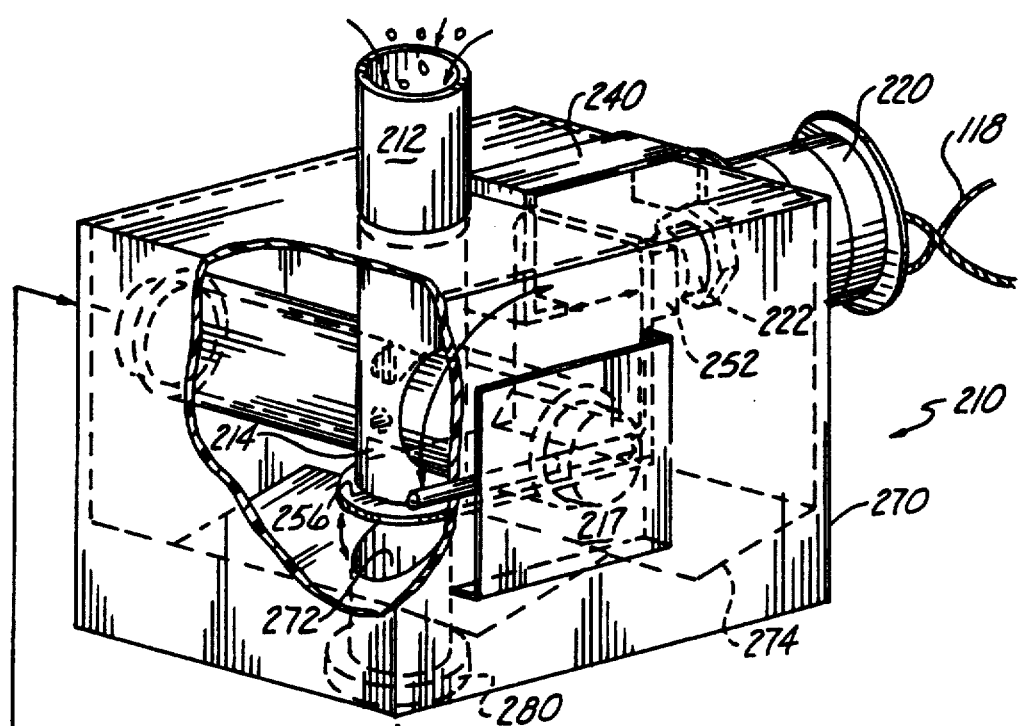
Fig. 18
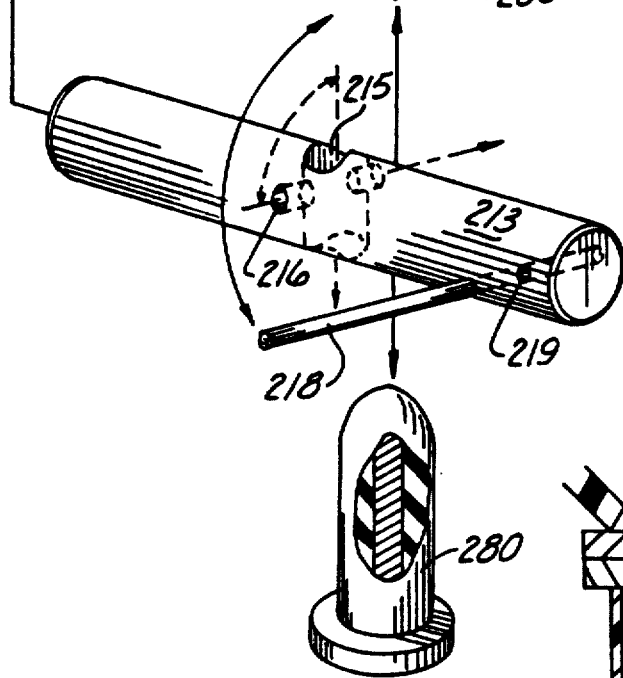
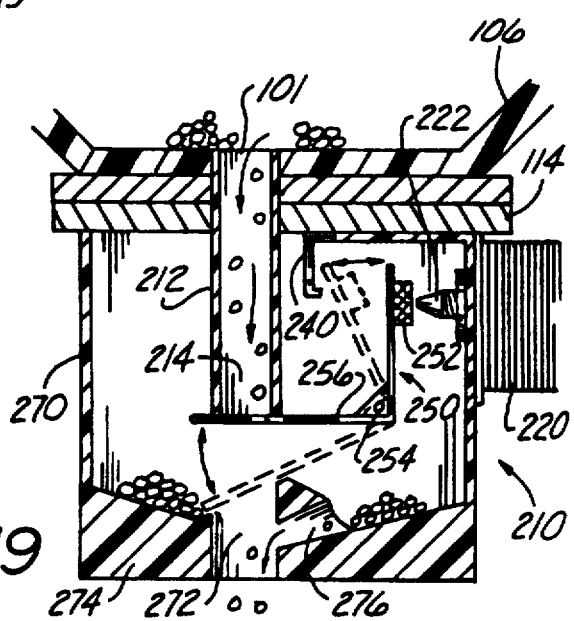
Fig. 19

ELECTROMAGNETIC METER FOR CLOSED DISPENSING CONTAINER

CROSS REFERENCE TO RELATED APPLICATIONS

Claiming Benefit Under 35 U.S.C. 120

This application is a continuation-in-part of application Ser. No. 07/779,075, filed Oct. 18, 1991, by Larry M. Conrad, now U.S. Pat. No. 5,156,372, issued Oct. 20, 1992.

INCORPORATION BY REFERENCE

The above referred to related application is incorporated herein by reference in its entirety, and hereby is made a part of this application.

TECHNICAL FIELD

This invention relates to metering devices, and more particularly to electromagnetic metering devices used in a closed dispensing container for granular materials.

BACKGROUND ART

Various electromagnetic metering devices are known but none are completely satisfactory for handling granular materials. Devices opened and closed by a sliding action, such as a solenoid value, are often jammed by the granular material and are slow to open and close.

Co-pending U.S. patent application Ser. No. 07/779,075, now issued as U.S. Pat. No. 5,156,372 to one of the co-inventors herein, discloses electromagnetic metering devices which overcome these problems. The availability of reliable metering devices has led applicants to consider the solution of various dispensing problems using these electromagnetic metering devices.

Agricultural workers are frequently required to handle hazardous materials such as pesticides, herbicides, fungicides, fertilizers, and even treated seeds that present a hazard to the worker, co-workers, children, farm animals and the environment in general. Many hazardous materials are packaged in standard fifty-pound paper or plastic bags. Unused materials in unopened bags, opened bags, and in chemical hoppers increases the risk of accidental exposure at times when the unwary worker is not focused on the need to take precautions.

One setting where the worker is required to handle large quantities of hazardous materials is during the planting operation. In the planting operation, almost all soil insecticides are applied from a storage hopper carried on the subframe of a planting unit. Typically, an hour-glass type device is used to control the flow of insecticide from the storage hopper to the seed furrow. Rate selections are made by adjusting the diameter or flow area of the constriction zone. A meter wheel feeds the reservoir above the constriction zone in excess of flow needs and stops the flow when the planting unit is raised or the drive chain removed. Once the initial settings are made, flow rate from these devices is a function of time only. Therefore, the worker must determine the planting speed and stick to it to achieve planting rate accuracy. Further, there is great variation from one storage hopper to another and each row must be individually calibrated and rechecked periodically. Also, as the desired application rates are lowered, the accuracy of the hour-glass device becomes very erratic and eventually non-functional.

Those concerned with these and other problems recognize the need for an improved metering device for granular materials.

DISCLOSURE OF THE INVENTION

The present invention provides a metering device for controlling the flow of granular material through a conduit. The metering device includes a electrical coil operably associated with the conduit, a ferromagnetic latching strip disposed in the magnetic field produced by the coil, and a pivoting gate including a magnet that is attracted toward and repelled from the latching strip as the direction of electrical current flowing through the coil is changed.

A closed container includes the metering device secured to its bottom so that the granular material can be dispensed only through the meter. The closed container is electrically connected by wires to a dispensing controller located in the tractor cab. The granular material, such as insecticide, is simultaneously and equally dispensed at the desired rate to the seed furrows from all the individual planting units of the planter.

An object of the present invention is the provision of an improved metering device for hazardous and other granular materials or seeds.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 6 is an enlarged sectional view of a third embodiment of the invention similar to the second embodiment but showing the gate pivot point raised to accommodate a different mounting structure;

FIG. 7 is a partial perspective view of a fourth embodiment of the invention;

FIG. 8 is an enlarged sectional view taken along line 8—8 of FIG. 7;

FIG. 9 is a partial perspective view of a fifth embodiment of the invention;

FIG. 10 is a sectional view taken along line 10—10 of FIG. 9;

FIG. 13 is a partial side elevational view showing the dispensing container mounted on the planting unit subframe with portions cutaway to show the relative positions of the dispensing valve and the insecticide funnel;

FIG. 14 is a top plan view of the closed container with a portion cutaway to show the position of the electromagnetic metering valve;

FIG. 15 is a sectional view taken along line 15—15 of FIG. 14 showing one embodiment of a metering valve used with the closed container;

FIG. 16 is a sectional view taken along line 16—16 of FIG. 15, showing the tamper resistant mounting flange which attaches the metering valve to the closed container;

FIG. 17 is a sectional view taken along line 17—17 of FIG. 16 showing the internal components of the metering valve;

FIG. 18 is an exploded perspective view of the metering valve showing the manually set flow adjusting spool which establishes the maximum flow rate from the closed container through the conduit at the metering valve and showing the friction-fit transport plug;

FIG. 19 is a sectional view similar to FIG. 17 showing the internal components of the metering valve;

BEST MODE FOR CARRYING OUT THE INVENTION

Description of FIGS. 1-10.

Figure 1:
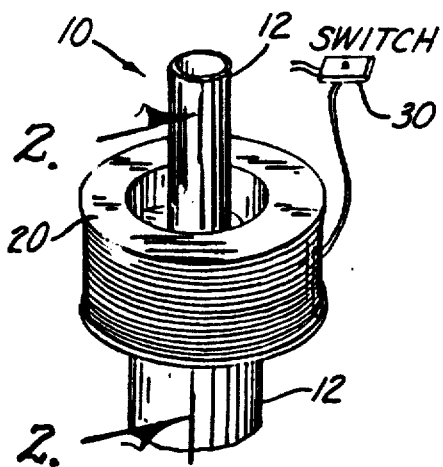
FIG. 1 is a partial perspective view of one embodiment of the invention.
Figure 2:
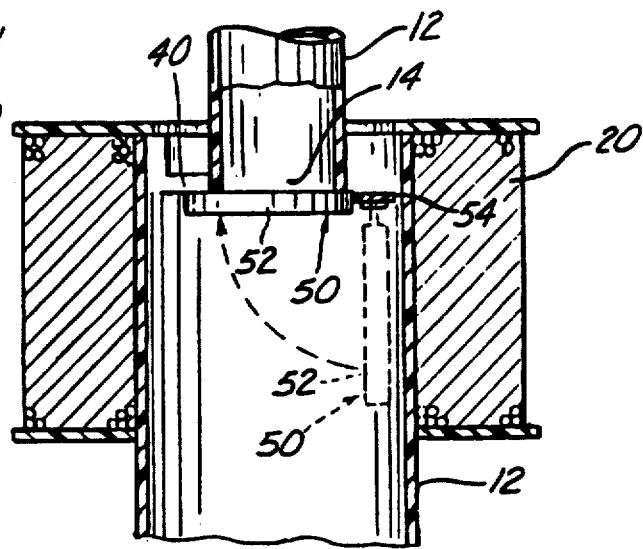
FIG. 2 is an enlarged sectional view taken along line 2—2 of FIG. 1.

Referring now to the drawings, wherein like reference numerals designate identical or corresponding parts throughout the several views, FIGS. 1 and 2 show one embodiment of the metering device (10) of the present invention suitable for mounting in the granular insecticide conduit (12) of a conventional agricultural planter. The metering device (10) includes an electrical coil (20) disposed to surround the conduit (12), a switch (30) for changing the direction of current flowing through the coil, an iron latching strip (40) disposed within the magnetic field produced by the coil (20), and a gate (50) formed of a round magnet (52) pivotally attached to the conduit by a hinge (54). The gate (50) is pivotally movable to the full-line position of FIG. 2 to cover the discharge opening (14) in the conduit (12) when the magnet (52) is attracted to and contacts the latching strip (40).

Granular material flows down the conduit (12) and out the discharge opening (14) when the gate (50) is open. The position of the flow gate (50) is controlled by the direction of the current flow in coil (20). When the magnetic field of the coil (20) is in the right direction, the flow gate (50) is forced up against the discharge opening (14), cutting off the granular flow. The iron latch strip (40) holds the flow gate (50) closed even when the power is turned off. The iron latch strip (40) is also necessary because the gate (50) will not completely close without it, or open or close with a quick response. When the magnetic field from the coil (20) is reversed, the iron latch strip (40) changes its magnetic polarity and repels the magnet (52). The magnetic field also repels the magnetic flow gate (50) so it is forced into the open position. The gate (50) will remain in the position it was in when the current is turned off, unless it is given a hard jolt.

Figure 3:
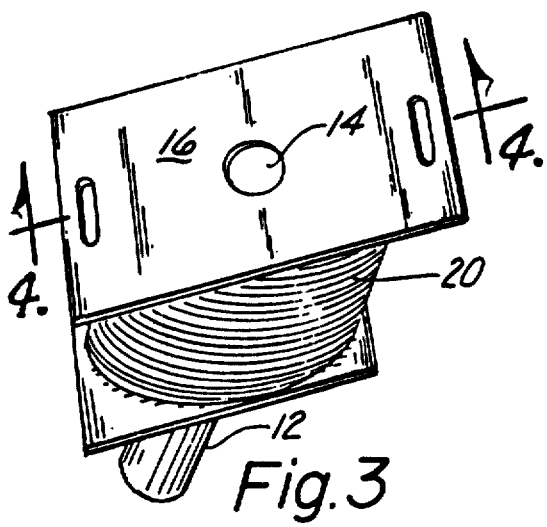
FIG. 3 is a partial perspective view of a second embodiment of the invention.
Figure 5:
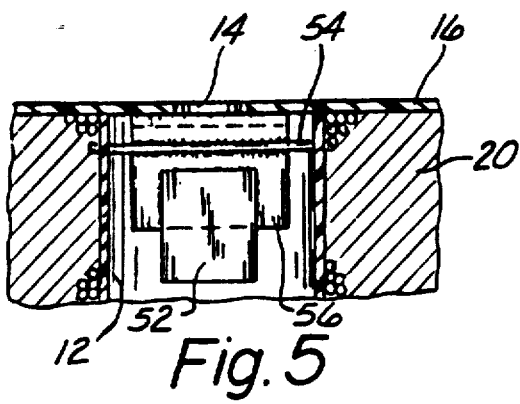
FIG. 5 is a sectional view taken along line 5—5 of FIG. 4.
Figure 4:
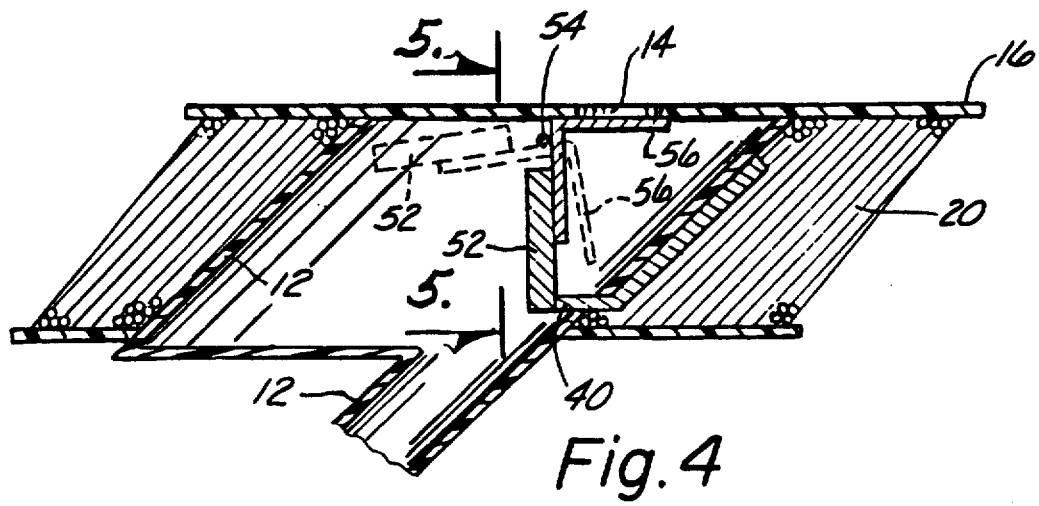
FIG. 4 is an enlarged sectional view taken along line 4—4 of FIG. 3.

FIGS. 3-5 show a second embodiment of the metering device (10) that is adapted to bolt to the bottom of an International Harvester 400 planter insecticide hopper (not shown). A plate (16) bolts to the bottom of the hopper. The flow gate (50) is redesigned because the magnet (52) needs to remain inside of the coil (20). The angled bracket (56) which forms a part of the flow gate is made of aluminum.

The operation of the second embodiment is basically the same as that of the first embodiment. Granules flow through the discharge opening (14) and the flow gate (50) pivots to open and close the discharge opening (14). In this embodiment the flow gate (50) automatically closes by gravity, anytime the flow of current doesn't hold it open. Therefore, electrical power is only needed to open it but it will not close as strongly as if it were closed with power.

FIG. 6 shows a third embodiment of the metering device (10) suitable for use with an International Harvester 800-900 planter. The only difference between it and the second embodiment is that the flow gate magnet (52) is mounted farther from the hinge (54), allowing the discharge opening (14) to be raised above plate (16). This embodiment will bolt in the hole on the planter that holds the funnel that the insecticide hose attaches to, therefore, no modifications are needed to mount it to the planter.

FIG. 7 and 8 show a fourth embodiment of the invention where the coil (20) is disposed outside of the conduit (12). A metallic frame or magnetic flux guide (60), extends around the coil (20). The flux guide (60) routes the magnetic flux lines to provide the proper magnetic field to control the gate magnet (52).

FIGS. 9 and 10 show a fifth embodiment of the invention similar to the fourth embodiment but incorporating a chamber (70) having a material outlet (72). This design reduces the possibility of chemical waste due to unit malfunction. The other embodiments can be left in a condition where the granular material will flow through the conduit (12) without obstruction when the gate (50) is in the open position. This embodiment works in a toggle fashion where the current must be turned on and then reversed to allow chemical to pass through the unit. Thus each time it toggles a specific amount of chemical is released from the chamber (70).

Description of FIGS. 11-23.

Figure 11:
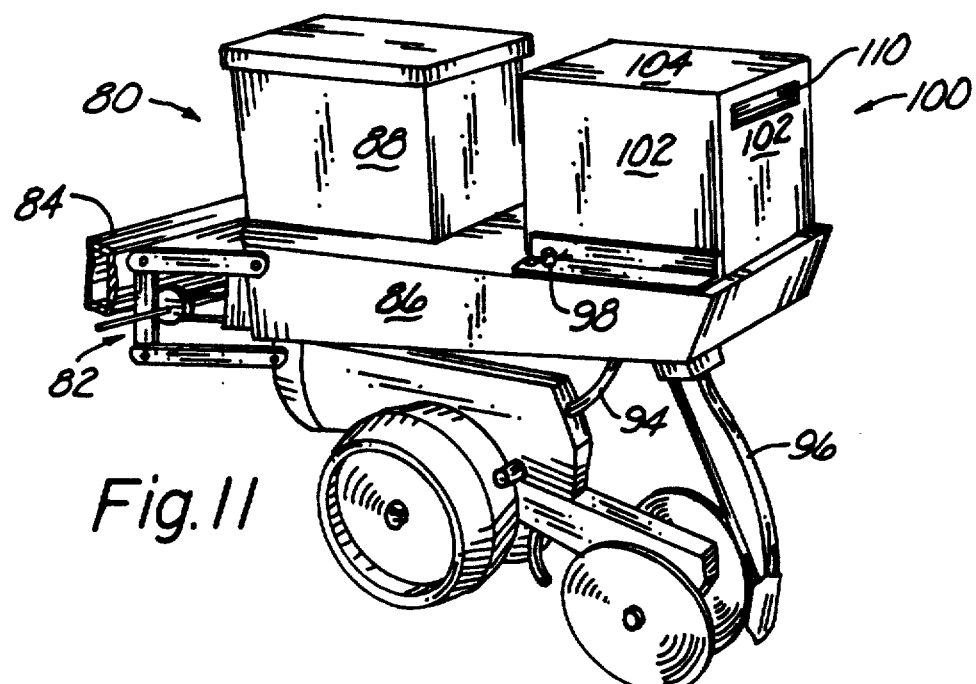
FIG. 11 is a perspective view of a single planting unit utilizing the closed granular dispensing container of the present invention.
Figure 12:
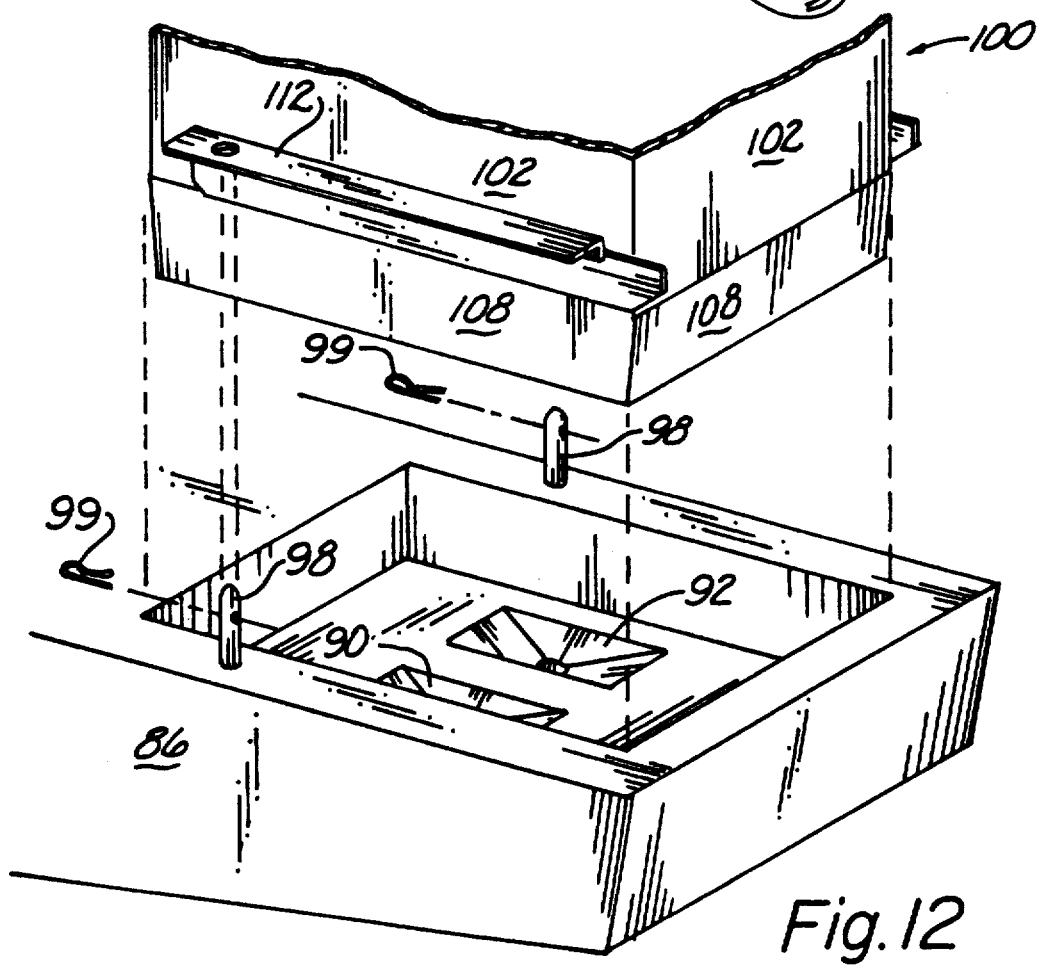
FIG. 12 is a partial exploded perspective view showing portions of the planting unit subframe and the relative positions of both the insecticide and herbicide funnels which direct granular material to the appropriate location during the planting process.

FIG. 11 shows an individual planting unit (80) attached by a four-bar linkage (82) to a tool bar (84). Typically, a number of planting units (80) are attached to the tool bar (84) in side-by-side relationship and pulled through a prepared field by a tractor to plant row crops such as corn or soybeans. Each of the planting units (80) includes a subframe (86) which supports a seed hopper (88) on the forward portion and a conventional granular chemical hopper (not shown) on the rearward portion. In FIGS. 11-13, the closed dispensing container (100) of the present invention is shown mounted on the rearward portion of the subframe (86) in the position normally occupied by the conventional chemical hopper. The rearward portion of the subframe also supports an insecticide funnel (90) and/or a herbicide funnel (92) each of which direct granular material through lines (94 and 96) to the appropriate location during the planting process. Also, locator pins (98) extend up from opposite sides of the subframe.

The closed dispensing container (100) includes sidewalls (102), a top wall (104), a sloping bottom wall (106), and a bottom skirt section (108) that extends down from the sidewalls (102). A pair of recessed hand grips (110) are formed in the front and rear sidewalls (102) and a pair of support brackets (112) are attached to the lateral sidewalls (102). It is to be understood that a universal adapter may be used so that the container (100) may be supported and secured on planting units made by all manufacturers, thus eliminating the need to attach brackets (112) to the sidewalls (102). The support brackets (112) rest on the subframe (86) and the locator pins (98) extend through openings in the brackets (112) and are secured by spring clips (99). As shown in FIG. 14, access to and from the closed container (100) is available only through the single opening (101) in the bottom wall (106).

As best shown in FIGS. 14-17, an electronic meter (210) is attached to the bottom wall (106) of the closed container (100) by a mounting flange (114) attached with tamper-resistant fasteners (116). Power to the meter (210) is supplied through wires (118) that lead to a connector (120) affixed to the front wall of the skirt section (108). A removable plug-in connector (122) is disengaged from the connector (120) when the container (100) is removed from the subframe (86).

Referring now to FIGS. 17-19, an embodiment of the meter (210) is shown and includes a conduit (212) in flow communication with the opening (101) in the bottom wall (106) of the closed container (100). A rotatable flow control spool (213) intersects the conduit (212) above the discharge opening (214). Apertures (215 and 216) of different diameters extend through the spool (213) and are aligned with the conduit (212). One end of the spool (213) extends through a tab (217) and a lever (218) is inserted in an opening (219) in the spool (213) to secure the spool (213) in alignment. Movement of the lever (218), as shown by the directional arrows (FIG. 18) changes the aperture (215 or 216) which aligns with the conduit (212) to limit the flow of granular material that flows to the discharge opening (214).

The meter (210) includes an electrical coil (220) disposed at one side of the conduit (212), a switch (not shown) for changing the direction of the current flowing through the coil (220), an iron latching strip (240) disposed within the magnetic field produced by the coil (220), and a gate (250) pivotally attached at one side of the conduit (212) by a hinge (254). A magnet (252) and a L-shaped bracket (256) make up the pivoted gate (250). A chamber (270) encloses the gate (250), the core (222) of the coil (220), and the discharge opening (214) of the conduit (212). The chamber (270) has a material outlet (272) located in its floor (274) and disposed so that one end of the L-shaped bracket (256) covers the material outlet (272) when the gate (250) engages the latching strip (240). A material overflow outlet (276) is formed at a low point in the floor (274) remote from the material outlet (272). Each cycle of the gate (250) between the closed position, shown in full line in FIG. 19, and the open position, shown in dashed line in FIG. 19, allows a specific amount of granular material to be released from the chamber (270) to feed into one of the funnels (90 or 92) of the planting unit (80). As best shown in FIG. 15, a friction-fit transport plug (280) is received in the material outlet (272) of the chamber (270) and extends up to contact the L-shaped bracket (256) of the gate (250). The plug (280) holds the gate (250) in the closed position when the container is being transported.

Figure 20:
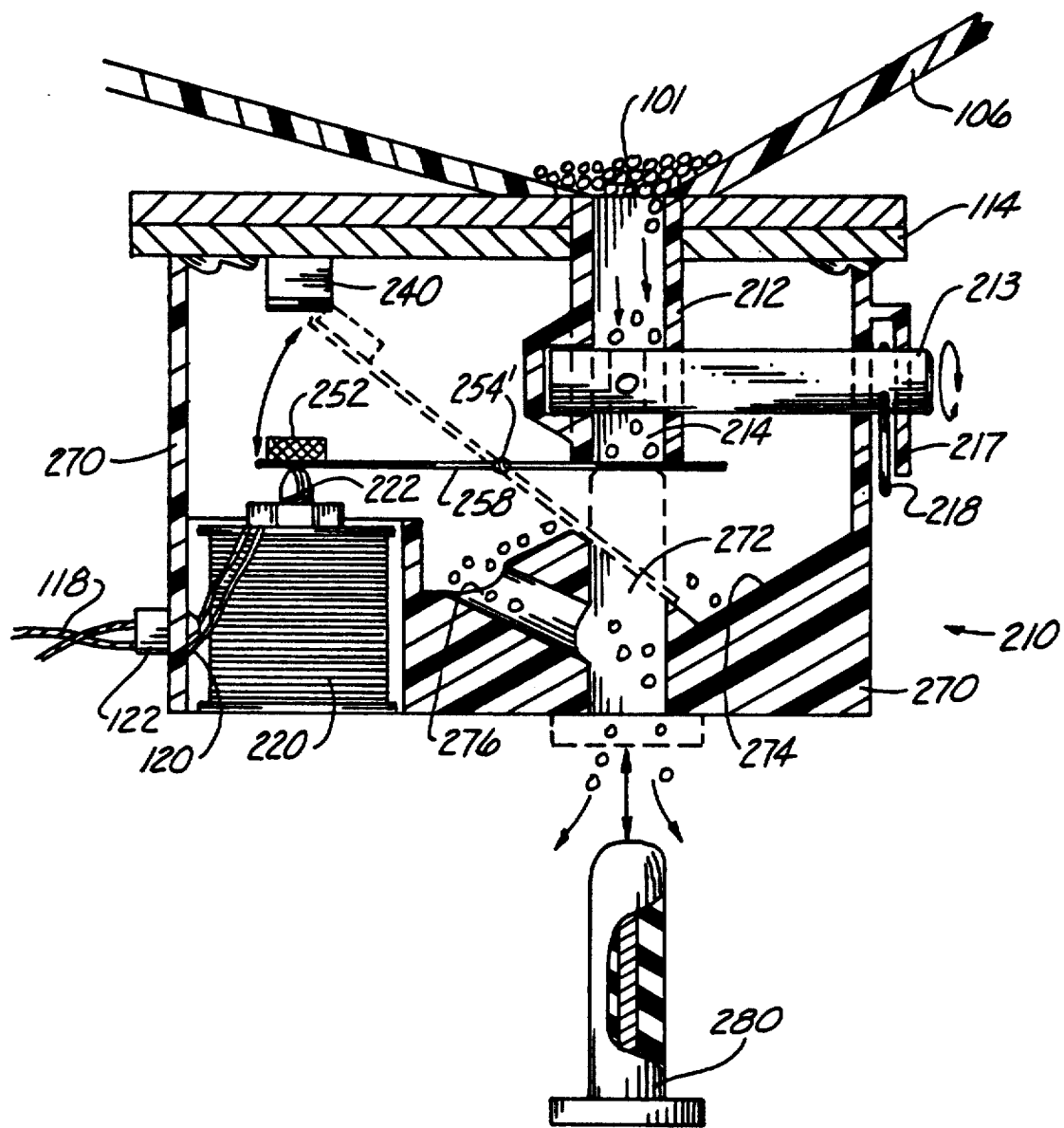
FIG. 20 is a sectional view showing the internal components of an alternate embodiment of a metering valve suitable for use with a closed container.

Another embodiment of the meter (210) is shown in FIG. 20. This embodiment is similar to that shown in FIGS. 15-19 except for the relative positions of the coil (220) and the latching strip (240). This arrangement allows for a linear bracket (258) in place of the L-shaped bracket (256).

Figure 21:
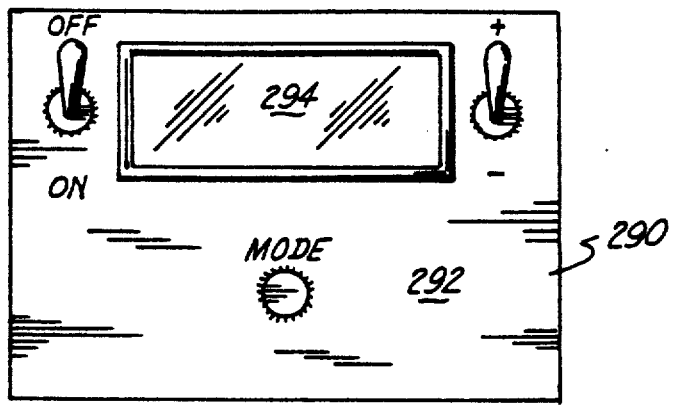
FIG. 21 is a front elevational view of a control panel accessible to the user in the tractor cab to control the flow of granular material from the closed container, through the metering valve, to the seed furrow formed by the planting unit.
Figure 22:
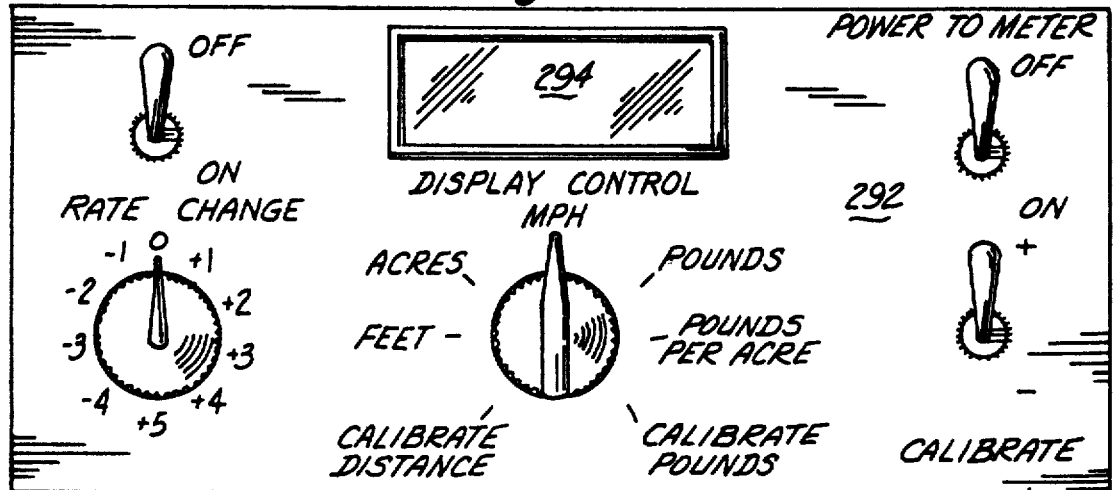
FIG. 22 is a front elevational view of an alternate embodiment of a user control panel.

FIGS. 21 and 22 show alternate embodiments of a control panel (290) accessible to the user from the cab of a tractor. The face plate (292) of the panel shown in FIG. 22 indicates the information monitored and processed by the control. These same categories of information will be indicated on the display (294) together with the appropriate numerical values.

Figure 23:
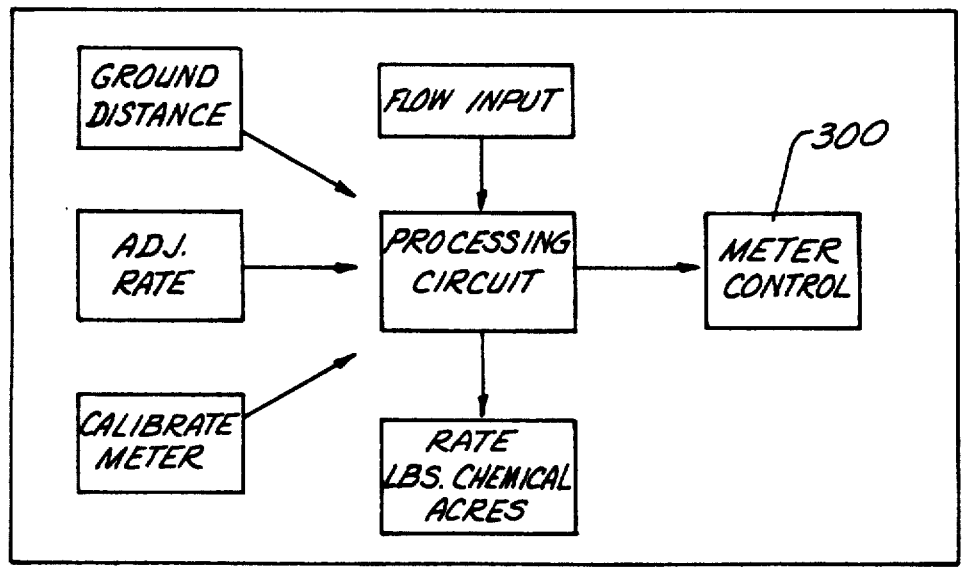
FIG. 23 is a block diagram illustrating the inputs to the meter control.

FIG. 23 illustrates the inputs to the meter control (300). The electronic control (300) measures ground distance and drops a specific amount of granular chemical at the calibrated distance. The system can be calibrated in the shop without operating the planter and can be used to change rates in the tractor cab electronically. The control (300) also monitors flow to indicate plugging or an empty container (100).

The control (300) receives a signal from a magnetic sensor on a rotating shaft driven from a ground wheel or a conventional sonar-type ground speed unit. The processing circuit takes a signal from a distance input, a manual control is used to adjust rates, and manual control is used to calibrate the meter display. The display furnishes the operator with information on total pounds applied, pounds per acre, total acres and ground speed. The processing circuit uses the inputs to display the information to the operator and control the meter flow rate. It also turns the meter off before the planter is raised and turns it on after the planter is lowered to prevent waste.

The present invention significantly improves on the accuracy of insecticide placement and significantly improves handler safety by reducing accidental exposure rates of pesticides.

The present invention has several key safety, environmental, and economic advantages.

The present invention provides a totally closed system. Short of physical damage to the container or willful misuse, there is no way for the farmer to access the product. The product is dispensed electronically from a moving planter only. Because of the closed system, higher concentrations of pesticide can be used. This reduces the poundage that must be handled and reduces the opportunity for physical damage and consequent exposure.

The totally closed system provides little opportunity for exposure to farm animals and children since the package is relatively impermeable and inaccessible except via a moving planter. This compares favorably against the standard 50 pound paper or plastic bag. In addition, there have been accidental poisonings by exposure to pesticide in the planter hoppers where the lids are not lockable. In the distribution channels, the risks are reduced by impermeable containers. Also, if the product is concentrated, less product to handle, ship and store results in less expense.

The system accurately dispenses pesticide according to the desired rate regardless of ground speed and enables the farmer to adjust desired rates on the go from zero to the full label rate. This enables the minimum desired rate to easily be dispensed. At the end-rows, quicker shut-off and start-up mechanism reaction times enables a more complete incorporation of the pesticide granules and less exposure to birds or run-off.

The farmer is able to save money by varying the lowest desirable rate on the go including shut-off where the pesticide is not needed. The farmer also saves money by minimizing end-row wastage. Further, the electronic metering system indicates if any row is not operating at the desired rate and thus prevents the economic loss of inadequate protection from inadequate rates. The farmer may return the unused pesticide in the returnable closed container for a refund of the unused portion, therefore, saving by using precisely what they need. Also, the initial capital costs of a planter can be lowered by eliminating the costs of existing hopper and chain drive assemblies.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. An electronic metering device for fluent material, comprising:
   a closed container including a bottom wall having an opening, the closed container being disposed to carry a supply of fluent material;
   an electronic meter attached to the closed container, the meter including a housing and a conduit disposed within the housing, the conduit having a discharge opening disposed in flow communication with the opening in the container, the meter further including:
      an electrical coil operably attached to the conduit and being disposed to produce a magnetic field when electrical current flows through the coil;
      switch means for selectively changing the direction of the electrical current flowing through the coil;
      a ferromagnetic latching strip operably attached to the conduit and disposed within the magnetic field produced by the coil; and
      a gate pivotally attached within the meter housing and being movable between a closed position covering the discharge opening and an open position spaced from the discharge opening, the gate including a magnet which is attracted to and contacts the latching strip when current flows through the coil in a first direction and which is repelled from and is spaced away from the latching strip when current flows through the coil in a second direction; and
   means for selectively sequencing the switch means to set a frequency for a cycle of movement of the gate between the closed position and the open position, the cycle frequency being effective to accurately control the amount of fluent material flowing from the meter over a predetermined time period.

2. The metering device of claim 1 wherein the metering device is attached to an implement disposed to travel over a work surface at a variable speed, the metering device further including:
   means for sensing the variable speed of the implement; and
   means for varying the cycle frequency set by the sequencing means as the speed of the implement varies, whereby the amount of fluent material flowing from the meter is controlled by the distance of travel of the implement.

3. The metering device of claim 1 further including a chamber disposed in flow communication with the discharge opening, the chamber including a material outlet disposed to be covered by the gate when the gate is in the open position spaced from the discharge opening.

4. The metering device of claim 2 further including a chamber disposed in flow communication with the discharge opening, the chamber including a material outlet disposed to be covered by the gate when the gate is in the open position spaced from the discharge opening.

5. The metering device of claim 2 wherein the implement is a planting unit having a subframe including a means for directing fluent material to a seed bed, and wherein the closed container includes sidewalls having attached brackets disposed to be supported on the subframe such that the attached meter is disposed above the directing means in flow communication therewith.

6. The metering device of claim 1 wherein the metering device is attached to the closed container by a mounting flange attached with tamper-resistant fasteners.

7. The metering device of claim 3 further including a removable friction-fit transport plug disposed to be received in the material outlet of the chamber and disposed to extend upward to contact the gate and hold the gate in the closed position when the container is being transported.

8. The metering device of claim 1 further including a rotatable flow control spool disposed to intersect the conduit above the discharge opening, the flow control spool including a plurality of apertures of varying diameters extending through the spool, the spool being selectively rotatable to align one of the plurality of apertures with the conduit to limit the flow of granular material to the discharge opening.

9. A metering device for agricultural compounds, comprising:
   a self-contained environmentally sealed closed container prefilled with a supply of fluent material to be dispensed yet isolated from an operator, the container including:
   a discharge opening; and
   meter means sealingly attached to the container in flow communication with the discharge opening for permitting the controlled discharge of material from the container;
   means for removably mounting the container on an agricultural implement; and
   means operably attached to the implement for activating the meter means and enabling dispensing from the container when the container is mounted on the agricultural implement.

10. The metering device of claim 9 wherein the amount of material flowing from the meter means is controlled based on a predetermined parameter, wherein the implement is disposed to travel over a work surface at a variable speed, and wherein the predetermined parameter is distance traveled by the implement.

11. The metering device of claim 9 wherein the meter means includes means for preventing the flow of material from the meter means when the implement is stationary.

12. The metering device of claim 9, wherein the meter means is electronically operated.

13. The metering device of claim 9 wherein the implement is a planting unit and the material is a pesticide.

14. The metering device of claim 13 wherein the material is granular.

* * * * *